US010368353B2

(12) United States Patent
Ly et al.

(10) Patent No.: US 10,368,353 B2
(45) Date of Patent: Jul. 30, 2019

(54) ADAPTIVE SUBCARRIER SPACING CONFIGURATION

(71) Applicant: QUALCOMM Incorporated, San Diego, CA (US)

(72) Inventors: Hung Ly, San Diego, CA (US); Hao Xu, Beijing (CN); Wanshi Chen, San Diego, CA (US); Peter Gaal, San Diego, CA (US); Tingfang Ji, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/880,218

(22) Filed: Jan. 25, 2018

(65) Prior Publication Data

US 2018/0220423 A1 Aug. 2, 2018

Related U.S. Application Data

(60) Provisional application No. 62/451,425, filed on Jan. 27, 2017.

(51) Int. Cl.
*H04W 72/04* (2009.01)
*H04L 1/00* (2006.01)
(Continued)

(52) U.S. Cl.
CPC ....... *H04W 72/0453* (2013.01); *H04L 1/0028* (2013.01); *H04L 5/0098* (2013.01);
(Continued)

(58) Field of Classification Search
CPC . H04L 1/0028; H04L 5/0098; H04L 27/2602; H04L 27/2621; H04W 72/0453
See application file for complete search history.

(56) References Cited

U.S. PATENT DOCUMENTS

| | | | | |
|---|---|---|---|---|
| 9,277,426 | B1 * | 3/2016 | Singh | H04W 24/10 |
| 2012/0195291 | A1 * | 8/2012 | Kuo | H04W 4/06<br>370/336 |

(Continued)

FOREIGN PATENT DOCUMENTS

| | | | |
|---|---|---|---|
| CN | 106376050 A | 2/2017 | |
| WO | WO-2016004634 A1 | 1/2016 | |

(Continued)

OTHER PUBLICATIONS

International Search Report and Written Opinion—PCT/US2018/015388—ISA/EPO—dated Jul. 3, 2018.

(Continued)

*Primary Examiner* — Benjamin H Elliott, IV
(74) *Attorney, Agent, or Firm* — Arent Fox LLP

(57) ABSTRACT

Methods and apparatuses for adaptive subcarrier spacing in wireless communication networks are described. For example, the described aspects include transmitting, from the UE to a network entity, a first PRACH transmission with a first subcarrier spacing; determining, by the UE, that the first PRACH transmission to the network entity is not successful; and transmitting, from the UE, a second PRACH transmission with a second subcarrier spacing in response to determining that the first PRACH transmission is not successful, wherein the first subcarrier spacing is different from the second subcarrier spacing.

12 Claims, 11 Drawing Sheets

(51) Int. Cl.
*H04L 5/00* (2006.01)
*H04L 27/26* (2006.01)

(52) U.S. Cl.
CPC ...... *H04L 27/2613* (2013.01); *H04L 27/2602* (2013.01); *H04L 27/2621* (2013.01)

(56) References Cited

U.S. PATENT DOCUMENTS

| | | | | |
|---|---|---|---|---|
| 2013/0195002 | A1* | 8/2013 | Walker | H04W 4/00 370/312 |
| 2013/0336295 | A1* | 12/2013 | Dinan | H04W 72/042 370/336 |
| 2015/0043491 | A1* | 2/2015 | Eng | H04W 16/14 370/329 |
| 2015/0215874 | A1* | 7/2015 | Chen | H04W 52/18 455/522 |
| 2016/0255591 | A1* | 9/2016 | Park | H04W 4/70 455/522 |
| 2016/0353440 | A1* | 12/2016 | Lee | H04W 4/70 |
| 2017/0094547 | A1* | 3/2017 | Yum | H04L 5/00 |
| 2017/0164350 | A1 | 6/2017 | Sun et al. | |
| 2017/0238344 | A1* | 8/2017 | McGowan | H04W 74/0833 370/329 |
| 2017/0303212 | A1* | 10/2017 | Takeda | H04W 52/325 |
| 2017/0303302 | A1 | 10/2017 | Bagheri et al. | |
| 2017/0311326 | A1 | 10/2017 | Wong et al. | |
| 2018/0077696 | A1* | 3/2018 | Lee | H04W 4/70 |
| 2018/0097679 | A1* | 4/2018 | Zhang | H04L 27/2678 |
| 2018/0220423 | A1* | 8/2018 | Ly | H04L 27/2613 |

FOREIGN PATENT DOCUMENTS

| | | | |
|---|---|---|---|
| WO | WO-2016171767 | A1 | 10/2016 |
| WO | WO-2017052319 | A1 | 3/2017 |

OTHER PUBLICATIONS

Qualcomm Incorporated : "SPS for V2V Communication", 3GPP Draft, R2-164063 SPS for V2V Communication, 3rd Generation Partnership Project (3GPP), Mobile Competence Centre , 650, Route Des Lucioles , F-06921, Sophia-Antipolis Cedex , France, vol. RAN WG2, No. Nanjing, China, May 23, 2016-May 27, 2016 May 22, 2016 (May 22, 2016), XP051105386, Retrieved from the Internet: URL:http://www.3gpp.org/ftp/Meetings_3GPP_SYNC/RAN2/Docs/ [retrieved on May 22, 2016], 4 pages.

Schaich F ., et al., "Subcarrier Spacing—a Neglected Degree of Freedom?", 2015 IEEE 16th International Workshop on Signal Processing Advances in Wireless Communications (SPAWC), IEEE, Jun. 28, 2015 (Jun. 28, 2015), pp. 56-60, XP033213202, DOI: 10.1109/SPAWC.2015.7226999[retrieved on Aug. 27, 2015] p. 56-p. 60.

Asustek: "Impact of Multiplexing Multiple Numerologies on Initial Access," 3GPP Draft; R1-1612902, Impact of Multiplexing Multiple Numerologies on Initial Access, 3rd Generation Partnership Project (3GPP), Mobile Competence Centre; 650, Route Des Lucioles; F-06921 Sophia-AN, vol. RAN WG1, No. Reno, USA; Nov. 14, 2016-Nov. 18, 2016, Nov. 4, 2016 (Nov. 4, 2016), XP051189531, 3 pages, Retrieved from the Internet: URL:http://www.3gpp.org/ftp/tsg_ran/WG1_RL1/TSGR1_87/Docs/ [retrieved on Nov. 4, 2016].

Ericsson LM., et al., "Narrowband LTE—Concept Description," 3GPP Draft; R1-154659, 3rd Generation Partnership Project (3GPP), Mobile Competence Centre ; 650, Route Des Lucioles ; F-06921 Sophia-Antipolis Cedex ; France vol. RAN WG1, No. Beijing, China; Aug. 24, 2015-Aug. 28, 2015 Aug. 23, 2015 (Aug. 23, 2015), XP051001893, Retrieved from the Internet: URL:http://www.3gpp.org/ftp/Meetings_3GPP_SYNC/RAN1/Docs/ [retrieved on Aug. 23, 2015], 9 pages.

Partial International Search Report—PCT/US2018/015388—ISA/EPO—dated Apr. 23, 2018.

* cited by examiner

300

700

710

Receive, at the UE, an SPS configuration for the UE from a network entity, wherein the SPS configuration includes a SPS-radio network temporary identifier (SPS-RNTI), a periodicity, and subcarrier spacing configuration, and wherein the subcarrier spacing configuration includes a plurality of subcarrier spacings

720

Transmit, by the UE, with a subcarrier spacing of the plurality of subcarrier spacings based at least on an indication received via downlink control information (DCI) over a physical downlink control channel (PDCCH) from the eNB

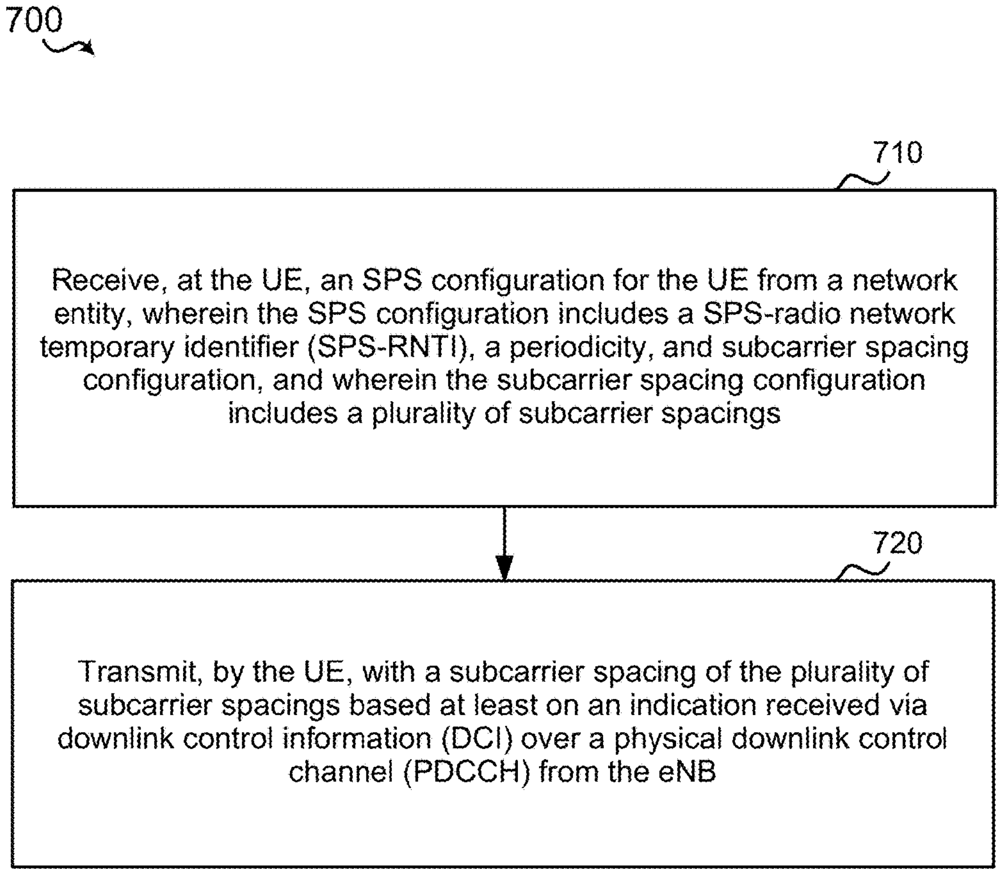

FIG. 7

ADAPTIVE SUBCARRIER SPACING CONFIGURATION

CLAIM OF PRIORITY UNDER 35 U.S.C. § 119

The present Application for Patent claims priority to U.S. Provisional Application No. 62/451,425 entitled "ADAPTIVE SUBCARRIER SPACING CONFIGURATION" filed Jan. 27, 2017, which is assigned to the assignee hereof and hereby expressly incorporated by reference herein.

BACKGROUND

Aspects of the present disclosure relate generally to wireless communication networks, and more particularly, to subcarrier spacing in wireless communication networks.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current subcarrier spacing configurations may not provide a desired level of speed or customization for efficient operations. Thus, improvements in wireless communication network operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method includes transmitting a physical random access channel (PRACH) from a user equipment (UE) in a new radio communication system. The described aspects include transmitting, from the UE to a network entity, a first PRACH transmission with a first subcarrier spacing. The described aspects further include determining, by the UE, that the first PRACH transmission to the network entity is not successful. The described aspects further include transmitting, from the UE, a second PRACH transmission with a second subcarrier spacing in response to determining that the first PRACH transmission is not successful, wherein the first subcarrier spacing is different from the second subcarrier spacing.

In an aspect, an apparatus for transmitting a PRACH from a UE in a new radio communication system may include a memory and at least one processor coupled to the memory and configured to transmit, from the UE to a network entity, a first PRACH transmission with a first subcarrier spacing. The described aspects further determine, by the UE, that the first PRACH transmission to the network entity is not successful. The described aspects further send, from the UE, a second PRACH transmission with a second subcarrier spacing in response to determining that the first PRACH transmission is not successful, wherein the first subcarrier spacing is different from the second subcarrier spacing.

In an aspect, a computer-readable medium may store computer executable code for transmitting a PRACH from a UE in a new radio communication system is described. The described aspects include code for transmitting, from the UE to a network entity, a first PRACH transmission with a first subcarrier spacing. The described aspects further include code for determining, by the UE, that the first PRACH transmission to the network entity is not successful. The described aspects further include code for transmitting, from the UE, a second PRACH transmission with a second subcarrier spacing in response to determining that the first PRACH transmission is not successful, wherein the first subcarrier spacing is different from the second subcarrier spacing.

In an aspect, an apparatus for transmitting a PRACH from a UE in a new radio communication system is described. The described aspects include means for transmitting, from the UE to a network entity, a first PRACH transmission with a first subcarrier spacing. The described aspects further include means for determining, by the UE, that the first PRACH transmission to the network entity is not successful. The described aspects further include means for transmitting, from the UE, a second PRACH transmission with a second subcarrier spacing in response to determining that the first PRACH transmission is not successful, wherein the first subcarrier spacing is different from the second subcarrier spacing.

In accordance with another aspect, a method includes performing a random access channel (RACH) procedure at a UE in a new radio communication system. The described aspects include receiving, by the UE from a network entity, subcarrier spacing configuration for one or more steps of a four step RACH procedure. The described aspects further include performing, by the UE, the one or more steps of the four step RACH procedure with one or more respective subcarrier spacings received in the subcarrier spacing configuration from the network entity.

In an aspect, an apparatus for performing a RACH procedure at a UE in a new radio communication system may include a memory and at least one processor coupled to the memory and configured to receive, by the UE from a network entity, subcarrier spacing configuration for one or more steps of a four step RACH procedure. The described aspects further perform, by the UE, the one or more steps of the four step RACH procedure with one or more respective subcarrier spacings received in the subcarrier spacing configuration from the network entity.

In an aspect, a computer-readable medium may store computer executable code for performing a RACH procedure at a UE in a new radio communication system is described. The described aspects include code for receiving, by the UE from a network entity, subcarrier spacing configuration for one or more steps of a four step RACH procedure. The described aspects further include code for performing, by the UE, the one or more steps of the four step RACH procedure with one or more respective subcarrier spacings received in the subcarrier spacing configuration from the network entity.

In an aspect, an apparatus for performing a RACH procedure from a UE in a new radio communication system is described. The described aspects include means for receiving, by the UE from a network entity, subcarrier spacing configuration for one or more steps of a four step RACH procedure. The described aspects further include means for performing, by the UE, the one or more steps of the four step RACH procedure with one or more respective subcarrier spacings received in the subcarrier spacing configuration from the network entity.

In accordance with another aspect, a method includes transmitting from a UE with semi persistent scheduling (SPS) in a new radio communication system. The described aspects include receiving, by the UE from a network entity, SPS configuration for the UE, wherein the SPS configuration includes a SPS-radio network temporary identifier (SPS-RNTI) and a periodicity. The described aspects further include receiving, at the UE, allocation information for the UE based at least on the SPS-RNTI, wherein the allocation information includes subcarrier spacing configuration. The described aspects further include transmitting, from the UE, based at least on the subcarrier spacing configuration.

In an aspect, an apparatus for transmitting from a UE with SPS in a new radio communication system may include a memory and at least one processor coupled to the memory and configured to receive, by the UE from a network entity, SPS configuration for the UE, wherein the SPS configuration includes a SPS-RNTI and a periodicity. The described aspects further receive, at the UE, allocation information for the UE based at least on the SPS-RNTI, wherein the allocation information includes subcarrier spacing configuration. The described aspects further transmit, from the UE, based at least on the subcarrier spacing configuration.

In an aspect, a computer-readable medium may store computer executable code for transmitting from a UE with SPS in a new radio communication system is described. The described aspects include code for receiving, by the UE from a network entity, SPS configuration for the UE, wherein the SPS configuration includes a SPS-RNTI and a periodicity. The described aspects further include code for receiving, at the UE, allocation information for the UE based at least on the SPS-RNTI, wherein the allocation information includes subcarrier spacing configuration. The described aspects further include code for transmitting, from the UE, based at least on the subcarrier spacing configuration.

In an aspect, an apparatus for transmitting from a UE with SPS in a new radio communication system is described. The described aspects include means for receiving, by the UE from the network entity, SPS configuration for the UE, wherein the SPS configuration includes a SPS-RNTI and a periodicity. The described aspects further include means for receiving, at the UE, allocation information for the UE based at least on the SPS-RNTI, wherein the allocation information includes subcarrier spacing configuration. The described aspects further include means for transmitting, from the UE, based at least on the subcarrier spacing configuration.

In accordance with another aspect, a method includes transmitting from a UE with SPS in a new radio communication system. The described aspects include receiving, by the UE from a network entity, SPS configuration for the UE, wherein the SPS configuration includes a SPS-RNTI, a periodicity, and subcarrier spacing configuration, and wherein the subcarrier spacing configuration includes a plurality of subcarrier spacings. The described aspects further include transmitting, from the UE, with a subcarrier spacing of the plurality of subcarrier spacings based at least on an indication received via downlink control information (DCI) over a physical downlink control channel (PDCCH) from the network entity.

In an aspect, an apparatus for transmitting from a UE with SPS in a new radio communication system may include a memory and at least one processor coupled to the memory and configured to receive, by the UE from a network entity, SPS configuration for the UE, wherein the SPS configuration includes a SPS-RNTI, a periodicity, and subcarrier spacing configuration, and wherein the subcarrier spacing configuration includes a plurality of subcarrier spacings. The described aspects further include transmitting, from the UE, with a subcarrier spacing of the plurality of subcarrier spacings based at least on an indication received via DCI over a PDCCH from the network entity.

In an aspect, a computer-readable medium may store computer executable code for transmitting from a UE with SPS in a new radio communication system is described. The described aspects include code for receiving, by the UE from a network entity, SPS configuration for the UE, wherein the SPS configuration includes a SPS-RNTI, a periodicity, and subcarrier spacing configuration, and wherein the subcarrier spacing configuration includes a plurality of subcarrier spacings. The described aspects further include code for transmitting, from the UE, with a subcarrier spacing of the plurality of subcarrier spacings based at least on an indication received via DCI over a PDCCH from the network entity.

In an aspect, an apparatus for transmitting from a UE with SPS in a new radio communication system is described. The described aspects include means for receiving, by the UE from a network entity, SPS configuration for the UE, wherein the SPS configuration includes a SPS-RNTI, a periodicity, and subcarrier spacing configuration, and wherein the subcarrier spacing configuration includes a plurality of subcarrier spacings. The described aspects further include means for transmitting, from the UE, with a subcarrier spacing of the plurality of subcarrier spacings based at least on an indication received via DCI over a PDCCH from the network entity.

In accordance with another aspect, a method includes transmitting subframes with adaptive subcarrier spacings from a UE in a new radio communication system. The described aspects include receiving, by the UE from a network entity, a subcarrier spacing configuration for one or more subframes, the subcarrier spacing configuration indicating a respective subcarrier spacing for each of the one or more subframes. The described aspects further include transmitting, from the UE, the one or more subframes with the respective subcarrier spacing for each of the one or more subframes.

In an aspect, an apparatus for transmitting subframes with adaptive subcarrier spacings from a UE in a new radio communication system may include a memory and at least one processor coupled to the memory and configured to receive, by the UE from a network entity, a subcarrier spacing configuration for one or more subframes, the subcarrier spacing configuration indicating a respective subcarrier spacing for each of the one or more subframes. The described aspects further transmit, from the UE, the one or more subframes with the respective subcarrier spacing for each of the one or more subframes.

In an aspect, a computer-readable medium may store computer executable code for transmitting subframes with adaptive subcarrier spacings from a UE in a new radio communication system is described. The described aspects include code for receiving, by the UE from a network entity, a subcarrier spacing configuration for one or more subframes, the subcarrier spacing configuration indicating a respective subcarrier spacing for each of the one or more subframes. The described aspects further include code for transmitting, from the UE, the one or more subframes with the respective subcarrier spacing for each of the one or more subframes.

In an aspect, an apparatus for transmitting subframes with adaptive subcarrier spacings from a UE in a new radio communication system is described. The described aspects include means for receiving, by the UE from a network entity, a subcarrier spacing configuration for one or more subframes, the subcarrier spacing configuration indicating a respective subcarrier spacing for each of the one or more subframes. The described aspects further include means for transmitting, from the UE, the one or more subframes with the respective subcarrier spacing for each of the one or more subframes.

In accordance with another aspect, a method includes adapting subcarrier spacings for subframes at a network entity in a new radio communication system. The described aspects include determining, at the network entity, a subcarrier spacing configuration for one or more subframes, the subcarrier spacing configuration indicating a respective subcarrier spacing for each of the one or more subframes. The described aspects further include transmitting, from the network entity, the subcarrier spacing configuration to a UE.

In an aspect, an apparatus for adapting subcarrier spacings for subframes at a network entity in a new radio communication system may include a memory and at least one processor coupled to the memory and configured to determine, at the network entity, a subcarrier spacing configuration for one or more subframes, the subcarrier spacing configuration indicating a respective subcarrier spacing for each of the one or more subframes. The described aspects further transmit, from the network entity, the subcarrier spacing configuration to a UE.

In an aspect, a computer-readable medium may store computer executable code for adapting subcarrier spacings for subframes at a network entity in a new radio communication system is described. The described aspects include code for determining, at the network entity, a subcarrier spacing configuration for one or more subframes, the subcarrier spacing configuration indicating a respective subcarrier spacing for each of the one or more subframes. The described aspects further include code for transmitting, from the network entity, the subcarrier spacing configuration to a UE.

In an aspect, an apparatus for adapting subcarrier spacings for subframes at a network entity in a new radio communication system is described. The described aspects include means for determining, at the network entity, a subcarrier spacing configuration for one or more subframes, the subcarrier spacing configuration indicating a respective subcarrier spacing for each of the one or more subframes. The described aspects further include means for transmitting, from the network entity, the subcarrier spacing configuration to a UE.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein:

FIG. 7 is a flow diagram illustrating an example of another method of transmitting from a UE with SPS in a wireless communication system in accordance with one or more aspects of the disclosure.

DETAILED DESCRIPTION

Figure 1:
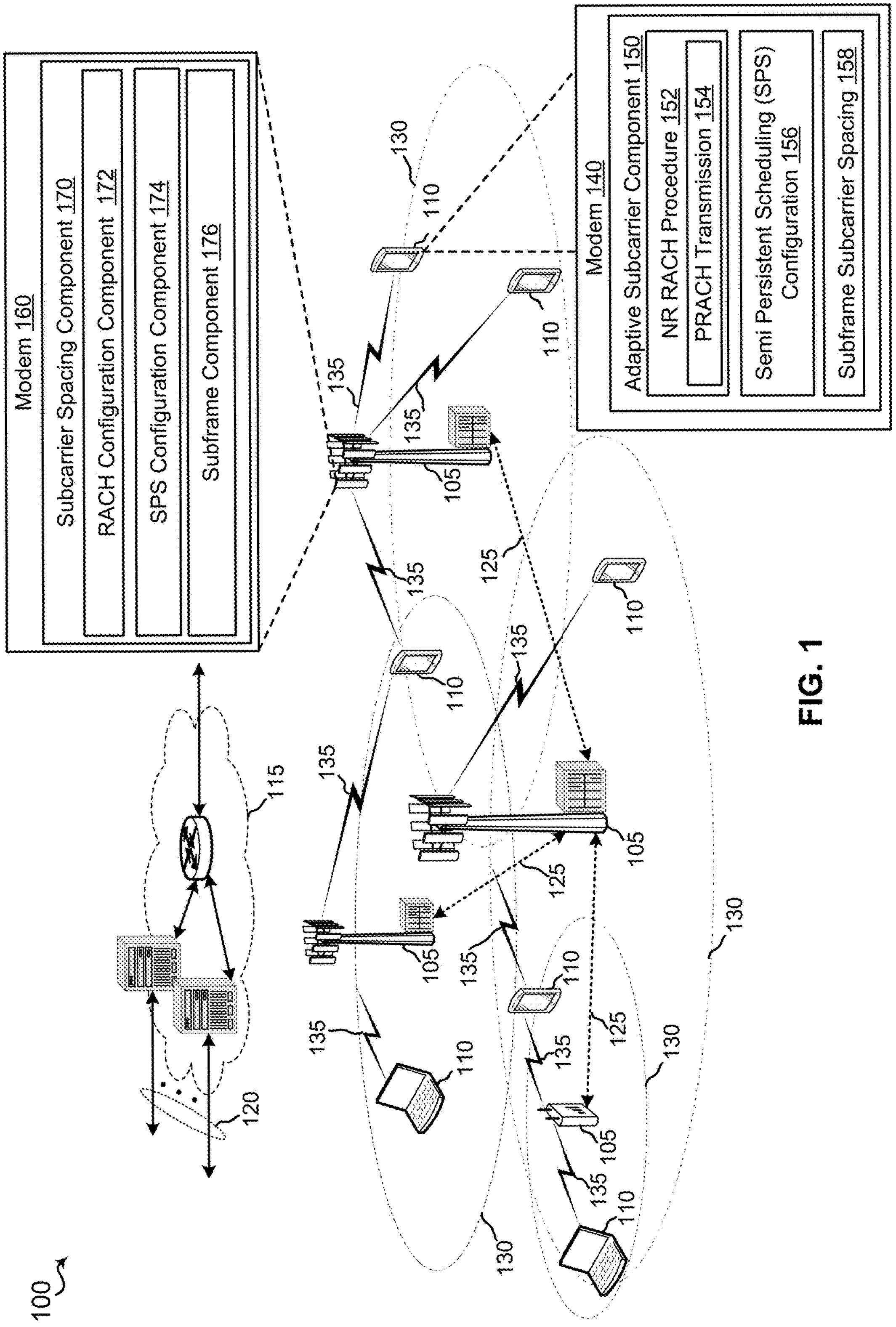
FIG. 1 is a schematic diagram of a wireless communication network including at least one base station having a subcarrier spacing configuration component and at least one UE for transmission with adaptive subcarrier spacing component configured according to this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present disclosure generally relates to adaptive or configurable subcarrier spacings at a UE via system information transmitted from an eNB. Additionally, configurable subcarrier spacings at a base station are described as well.

Additional features of the present aspects are described in more detail with respect to FIGS. 1-11.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 that manages a new radio (NR) random-access channel (RACH) procedure 152, semi persistent scheduling configuration 156, and/or subframe subcarrier spacing 158, in communication with base station 105.

For example, base station 105, subcarrier spacing component 170, and/or RACH configuration component 172 may configure (e.g., set) NR RACH procedure 152 with different subcarrier spacings (e.g., a subcarrier spacing configuration that may include different subcarrier spacings) for different steps (or messages/Msgs) of a four step RACH procedure. In one implementation, base station 105 may configure Msgs 1, 2, 3, and 4 of NR RACH procedure 152 with subcarrier spacings of s1, s2, s3, and/or s4, respectively. In an additional implementation, UE 110 may transmit Msg 1, which may be a physical random access channel (PRACH) transmission, for example, PRACH transmission 154, with different subcarrier spacings from one transmission attempt to another (re) transmission attempt. For instance, UE 110 may send an initial transmission of PRACH transmission 154 with a subcarrier spacing of s11, and re-transmit successive PRACH transmissions (when earlier transmission of PRACH transmission is not successful) with subcarrier spacings of s12, s13, s14, etc. until a PRACH re-transmission limit is reached. In other words, UE 110 re-transmits PRACH transmissions until the re-transmission attempt limit is reached for PRACH transmissions or UE 110 determines transmission of PRACH transmission 154 is successful.

Base station 105 includes a modem 160 and/or a subcarrier spacing component 170 for configuring subcarrier spacing for UE 110 and/or base station 105. In other words, base station 105 and/or subcarrier spacing component 170 may configure subcarrier spacing for downlink transmissions from base station 105 to UE 110 and/or uplink transmissions from UE 110 to base station 105.

Further, base station 105, subcarrier spacing component 170, and/or semi persistent scheduling (SPS) component 174 may configure SPS configuration 156 which may include subcarrier spacing configuration, which further includes a plurality of subcarrier spacings which are different from each other, during SPS activation. Furthermore, base station 105 may transmit radio resource control (RRC) configuration of several subcarrier spacings to UE 110 during SPS configuration, and indicate to UE 110 via downlink control information (DCI) over a physical downlink control channel (PDCCH) or a physical downlink shared channel (PDSCH) during SPS allocation which subframe spacing UE should be used for PDSCH/PUSCH transmission. It should also be noted that SPS may be applied for either physical uplink shared channel (PUSCH), physical downlink shared channel (PDSCH), or both. This improves efficiency in wireless communications over LTE as LTE only allows for the same subcarrier spacing for PUSCH and PDSCH transmissions. In the present disclosure, different subcarrier spacings may be configured for PUSCH and PDSCH transmissions.

Additionally, base station 105, subcarrier spacing component 170, and/or subframe component 176 may configure subframe configuration 158 at UE 110 with different subcarrier spacings in different subframes. For example, base station 105 may configure subframe 0 with a subcarrier spacing of $s_{fn}$, subframe 1 with a subcarrier spacing of $s_{f1}$, subframe 2 with a subcarrier spacing of $s_{f2}$, etc. Base station 105 may configure different subcarrier spacing in different subframes for all of the physical channels at UE 110 or a subset of the physical channels at UE 110.

Thus, according to the present disclosure, subcarrier spacing component 170 may configure subcarrier spacing at UE 110 in a manner that improves wireless communications.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary and/or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs 110. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bi-directional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or a listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
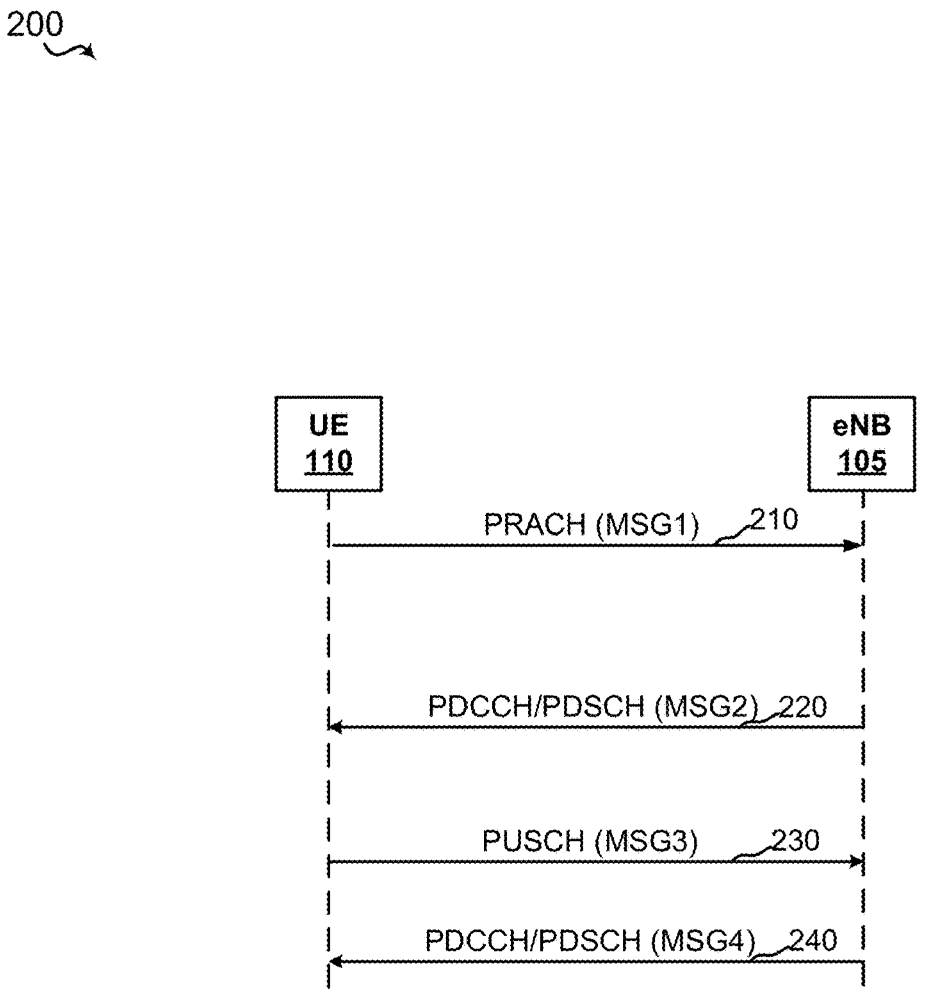
FIG. 2 is a flow diagram illustrating an example RACH procedure in accordance with one or more aspects of the disclosure.

Referring to FIG. 2, a four step RACH procedure 200 where UE 110 exchanges messages with one or more base stations 105 to gain access to a wireless network and establish a connection is described below.

At 210, for example, UE 110 may transmit a first message (Msg 1) 210, which may be referred to as a physical random access channel (PRACH) transmission to one or more base stations 105. Msg 1 (110) may include a RACH preamble and a cyclic prefix (CP). UE 110 also provides UE's identity, for example, random access-radio network temporary identifier (RA-RNTI) to one or more base stations 105. RA-RNTI is generally determined from the time slot number in which the RACH preamble is sent.

At 220, one or more of base stations 105 may respond to Msg 1 by transmitting a second message (Msg 2) 220, which may be referred to as a random access response (RAR) message, over a physical downlink control channel (e.g., PDCCH) and/or a physical downlink shared channel (e.g., PDSCH). For example, Msg 2 may include one or more of a temporary cell radio network temporary identifier (C-RNTI) which is used for further communications between UE 110 and base station 105, a timing advance value to compensate for the round trip delay caused by distance between UE 110 and base station 105, and/or a uplink grant resource which includes an initial resource assigned to UE 110 so that the UE 110 can use uplink-shared channel (UL-SCH).

At 230, in response to receiving Msg 2, UE 110 transmits a third message (Msg 3) 230, which may be a RRC connection request message to base station 105 via UL-SCH/PUSCH. In an aspect, Msg 3 may include UE identity (TMSI or a random value) and/or a connection establishment cause which indicates the reason why UE 110 needed to connect to network.

At 240, in response to receiving Msg 3, base station 105 may transmit a fourth message (Msg 4) 340, which may be referred to as a contention resolution message, to UE 110 when Msg 3 (330) is successfully received at 330. UE 110 may receive Msg 4 (340) via a physical downlink control channel (e.g., PDCCH) and/or a physical downlink shared channel (e.g., PDSCH). For example, Msg 4 may include a new cell radio network temporary identifier (C-RNTI) for UE 110 to use in subsequent communications.

In some instances, the transmission of Msg 1 (210) from UE 110 may not be successful. For example, UE 110 may not have received a Msg 2 220 (response) from base station 105; UE 110 may have failed to decode Msg 2 (210); UE 110 may have been successful in decoding Msg 2 (220) but may have failed to decode Msg 4 (240); or UE 110 may have decoded Msg 4 (240), but the decoded message indicated collision. In such scenarios, RACH set up may not be considered as successful. Therefore, the present disclosure provides a NR RACH procedure 300 for improved, enhanced, and/or efficient RACH procedure in NR.

Figure 3:
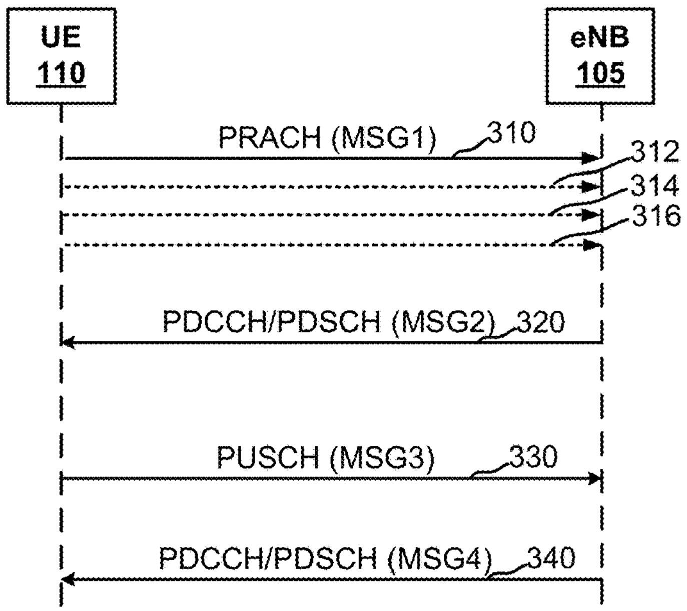
FIG. 3 is a flow diagram illustrating an example NR RACH procedure in accordance with one or more aspects of the disclosure.

Referring to FIG. 3, UE 110 may execute an implementation of NR RACH procedure 152 of the present disclosure. The execution of NR RACH procedure 152 is described below.

In current RACH procedures, subcarrier spacing for RACH messages (e.g., Msgs 1, 2, 3, and 4) is fixed. For instance, Msg 1 may have a subcarrier spacing of 1.25 KHz or 7.5 KHz (depending on cell coverage) and/or Msgs 2, 3, and/or 4 may have a subcarrier spacing of 15 KHz. In some implementations, base station 105, subcarrier spacing component 170, and/or RACH configuration component 182 may configure the different messages of NR RACH procedure 152 with different subcarrier spacings. For example, Msg 1 310 of NR RACH procedure 152 may be configured with a subcarrier spacing of s11, Msg 2 320 may be configured with a subcarrier spacing of s12, Msg 3 330 may be configured with a subcarrier spacing of s13, and/or a Msg 4 340 may be configured with a subcarrier spacing of s14. This provides for flexibility which may further improve the efficiency and/or reliability of NR RACH procedure 152.

At 310, for example, UE 110 may transmit a first message (Msg 1), which may be referred to as a random access request message, to one or more base stations 105 via a physical channel, such as a physical random access channel (PRACH). Msg 1 110 may also be referred as PRACH transmission 154 and may include a RACH preamble and a cyclic prefix (CP). However, as described above, the transmission of Msg 1 310 may not be always successful.

In some implementations, UE 110 may re-transmit Msg 1 as Msg 1 312 with a subcarrier spacing that is different from subcarrier spacing of previously transmitted Msg 1 310. For example, UE 110 may transmit (or re-transmit) Msg 1 312 with a subcarrier spacing s2 which is different from subcarrier spacing s1 used for transmitting Msg 1 210. In an aspect, base station 105, subcarrier spacing component 170 and/or RACH configuration component 172 may configure subcarrier spacings, s1, s2, etc. via system information (e.g., master information block (MIB), minimum system information block (MSIB), etc.) to UE 110.

The re-transmission of Msg 1, e.g., Msg 1 312, with a subcarrier spacing s2 that is lower than subcarrier spacing s1 of Msg 1 310, allows for transmission of a signal associated with Msg 1 for longer duration (e.g., in the time domain). UE 110 may re-transmit Msg 1 with reduced subcarrier spacing(s) until Msg 1 is successfully transmitted to base station 105 or until a PRACH re-transmission attempt limit is reached. For example, UE 110 may re-transmit Msg 1 as Msg 1 314 with a subcarrier spacing of s3. UE 110 may continue to re-transmit Msg 1 with lower subcarrier spacings in successive re-transmissions attempts until re-transmission attempt limit is reached. However, if transmission of Msg 1 is not successful, and UE 110 reaches the re-transmission attempt limit, UE 110 may increase transmission power (e.g., in power domain) of Msg 1. That is, Msg 1 is re-transmitted at a high transmission power level so that the (re)transmission of Msg 1 to base station 105 is successful. For example, UE 110 may re-transmit Msg 1 as Msg 1 316 by transmitting Msg 1 316 with increased transmission power (in the time domain). In other words, Msg 1 316 may be transmitted at a power level p2 which is higher than power p1 used for transmitting messages 314 and 312. Further, it should be noted that the re-transmission of Msg 1 may be performed with increased power (in power domain) or by decreasing/reducing subcarrier spacing, in any order, based on system information received from base station 105 if the transmission of the earlier Msg 1 is not successful.

At 320, one of more of the base stations 105 may respond to Msg 1 by transmitting a second message (Msg 2), which may be referred to as a random access response (RAR) message, over a physical downlink control channel (e.g., PDCCH) and/or a physical downlink shared channel (e.g., PDSCH). For example, Msg 2 may include one or more of a detected preamble identifier (ID), a timing advance (TA) value, a temporary cell radio network temporary identifier (TC-RNTI), a backoff indicator, an UL grant, and a DL grant.

At 330, in response to receiving Msg 2, UE 110 transmits a third message (Msg 3), which may be an RRC connection request or a scheduling request, via a physical uplink channel (e.g., PUSCH) based on the UL grant provided in Msg 2. In an aspect, Msg 3 may include a tracking area update (TAU), such as on a periodic basis or if UE 110 moves outside of one or more tracking areas (TAs) initially provided to UE 110 in a tracking area identifier (TAI) list. Also, in some cases, Msg 3 may include a connection establishment cause indicator, which identifies a reason why UE 110 is requesting to connect to the network.

At 340, in response to receiving Msg 3, base station 105 may transmit a fourth message (Msg 4), which may be referred to as a contention resolution message, to UE 110 via a physical downlink control channel (e.g., PDCCH) and/or a physical downlink shared channel (e.g., PDSCH). For example, Msg 4 may include a cell radio network temporary identifier (C-RNTI) for UE 110 to use in subsequent communications.

Figure 4:
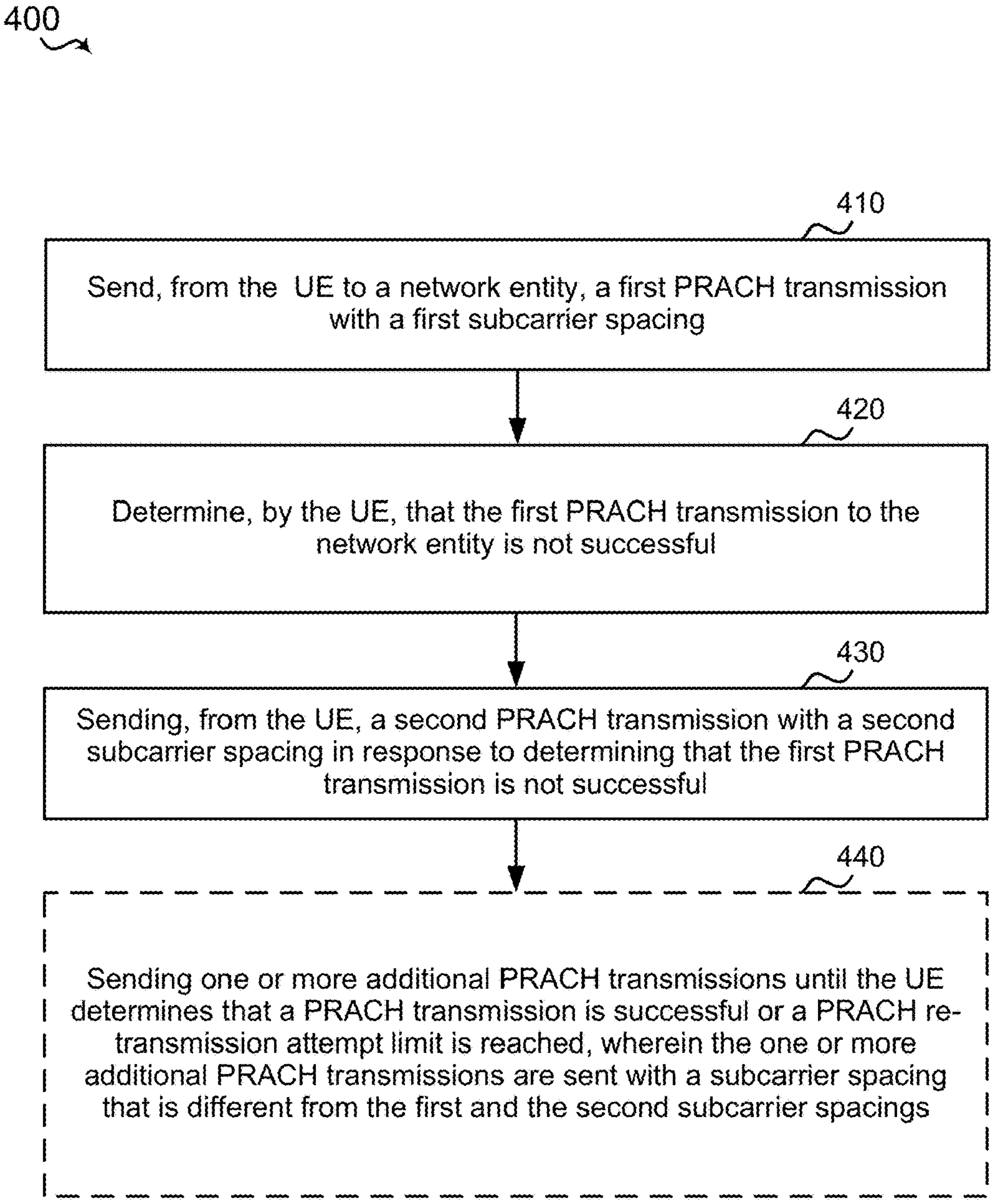
FIG. 4 is a flow diagram illustrating an example of a method of transmitting a PRACH from a UE in a wireless communication system in accordance with one or more aspects of the disclosure.

Referring to FIG. 4, a flow diagram illustrating examples of a method 400 related to transmitting a physical random access channel (PRACH) from a UE in accordance with various aspects of the present disclosure is described. Although the operations described below are presented in a particular order and/or as being performed by an example component, the ordering of the actions and the components performing the actions may be varied, depending on the implementation. Also, although the adaptive subcarrier component 150 is illustrated as having a number of subcomponents, one or more of the illustrated subcomponents may be separate from, but in communication with, the adaptive subcarrier component 150, and/or each other. Moreover, any of actions or components described below with respect to the adaptive subcarrier component 150 and/or any subcomponents may be performed by a specially-programmed processor, a processor executing specially-programmed software or computer-readable media, or by any other combination of a hardware component and/or a software component specially configured for performing the described actions or components.

In an aspect, at block 410, method 400 includes transmitting, from the UE to a network entity, a first PRACH transmission with a first subcarrier spacing. For example, in an aspect, UE 110 and/or adaptive subcarrier component 150 may execute NR RACH procedure 152 to transmit Msg 1 210 via a transmitter (e.g., transmitter 1008, FIG. 10) with a subcarrier spacing of s1, as described herein. In an example, UE 110 and/or adaptive subcarrier component 150 may receive the first subcarrier spacing and the second subcarrier spacing from the base station 105 via system information. Further, the system information may include a random access channel (RACH) configuration indicating a linkage between the first subcarrier spacing and the second subcarrier spacing.

In an aspect, at block 420, method 400 includes determining, by the UE, that the first PRACH transmission to the network entity is not successful. For example, in an aspect, UE 110 and/or adaptive subcarrier component 150 may execute NR RACH procedure 152 to determine that the first PRACH transmission, Msg 1 210 is not successful, as described herein.

In an aspect, at block 430, method 400 includes transmitting, from the UE, a second PRACH transmission with a second subcarrier spacing in response to determining that the first PRACH transmission is not successful. For example, in an aspect, UE 110 and/or adaptive subcarrier component 150 may execute NR RACH procedure 152 to re-transmit Msg 1 312 via a transmitter (e.g., transmitter 808, FIG. 8) with a subcarrier spacing of s2, as described herein. In one implementation, subcarrier spacing s2 (e.g., 7.5. KHz) may be smaller than subcarrier spacing s1 (15 KHz). The re-transmission of Msg 1 312 at a lower subcarrier spacing allows for transmission of signal associated with Msg 1 312 for a longer duration (in the time domain).

In an aspect, at block 440, method 400 may optionally include transmitting one or more additional PRACH transmissions until the UE determines that a PRACH transmission is successful or a PRACH re-transmission attempt limit is reached, wherein the one or more additional PRACH transmissions are sent with a subcarrier spacing that is different from the first and the second subcarrier spacings. For example, in an aspect, UE 110 and/or adaptive subcarrier component 150 may execute NR RACH procedure 152 to send one or more additional PRACH transmissions, e.g., Msg 1 314 via a transmitter (e.g., transmitter 1008, FIG. 10), as described herein. UE 110 may transmit Msg 1 314 when the earlier transmission of Msg 1 312 is not successful. In one implementation, Msg 1 314 may be transmitted with a subcarrier spacing of s3, for example, which may be lower than s2. For instance, s3 may be 3.75 KHz. UE 110 may continue to re-transmit Msg 1 at lower subcarrier spacings until the transmission of Msg 1 is successful (as described above) or until the re-transmission attempt limit is reached.

Figure 5:
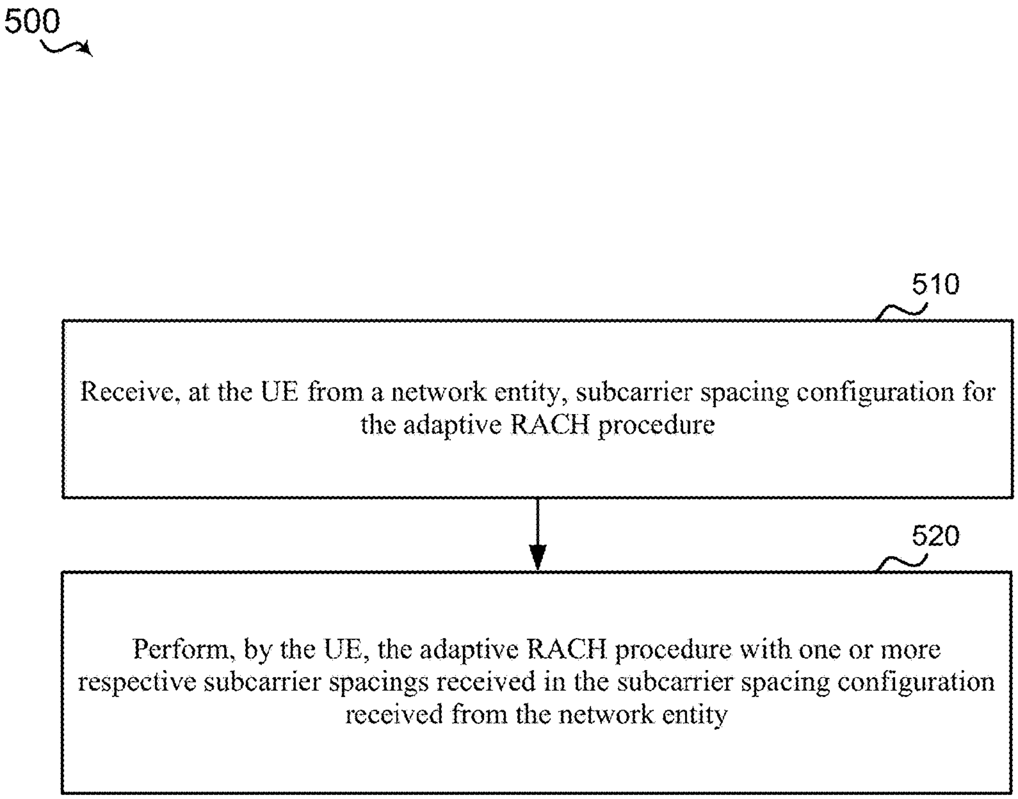
FIG. 5 is a flow diagram illustrating an example of a method of performing a RACH procedure at a UE in a wireless communication system in accordance with one or more aspects of the disclosure.

Referring to FIG. 5, a flow diagram illustrating examples of a method 500 related to performing an adaptive random access channel (RACH) procedure at a UE in accordance with various aspects of the present disclosure is described. Although the operations described below are presented in a particular order and/or as being performed by an example component, the ordering of the actions and the components performing the actions may be varied, depending on the implementation. Also, although the adaptive subcarrier component 150 is illustrated as having a number of subcomponents, one or more of the illustrated subcomponents may be separate from, but in communication with, the adaptive subcarrier component 150, and/or each other. Moreover, any of actions or components described below with respect to the adaptive subcarrier component 150 and/or any subcomponents may be performed by a specially-programmed processor, a processor executing specially-programmed software or computer-readable media, or by any other combination of a hardware component and/or a software component specially configured for performing the described actions or components.

In an aspect, at block 510, method 500 includes receiving, at the UE from a network entity, a subcarrier spacing configuration for the adaptive RACH procedure. For example, in an aspect, UE 110 and/or adaptive subcarrier component 150 may receive subcarrier spacing configuration for one or more steps of a four step RACH procedure via a transmitter (e.g., transmitter 1008, FIG. 10), as described herein. For example, UE 110 and/or adaptive subcarrier component 150 may receive subcarrier spacing configuration which may include subcarrier spacings for Msgs 1 and/or 3 which may be s11 and/or s41, respectively. Base Station 105 may configure subcarrier spacings s21 and/or s31 for Msgs 2 and/or 4, respectively. This provides flexibility for UE 110 and/or base station to transmit different messages of the four step RACH procedure, e.g., NR RACH procedure 152, with different subcarrier spacings to improve efficiency in wireless communications. It should be also noted that the subcarrier configuration described above (e.g., s11, s21, s31, and s41) is a non-limiting example. In other example aspects, base station 105 may configure different subcarrier spacings as determined by the base station.

In an aspect, at block 520, method 500 includes performing, by the UE, the adaptive RACH procedure with one or more respective subcarrier spacings received in the subcarrier spacing configuration from the network entity. For example, in an aspect, UE 110 and/or adaptive subcarrier component 150 may perform one or more steps of the four step RACH procedure, e.g., Msgs 1 and 3, with respective subcarrier spacings received in the subcarrier spacing configuration received from the eNB, as described herein.

In an example, the adaptive RACH procedure corresponds to a four-step process of communicating a plurality of messages between the UE and the network entity, each of the plurality of messages includes a different subcarrier spacing of the one or more respective subcarrier spacings. For instance, the plurality of messages includes a first message sent from the UE to at least the network entity, the first message corresponding to a physical random access channel (PRACH) transmission with a first subcarrier spacing of the one or more respective subcarrier spacings. In another instance, the plurality of messages includes a second message sent from the network entity to the UE, the second message corresponding to at least one of a PDCCH or a PDSCH transmission with a second subcarrier spacing of the one or more respective subcarrier spacings. In another instance, the plurality of messages includes a third message sent from the UE to the network entity, the third message corresponding to a Physical Uplink Shared Channel (PUSCH) transmission with a third subcarrier spacing of the one or more respective subcarrier spacings. In another instance, the plurality of messages includes a fourth message sent from the network entity to the UE, the fourth message corresponding to at least one of a PDCCH or a PDSCH transmission with a fourth subcarrier spacing of the one or more respective subcarrier spacings.

Figure 6:
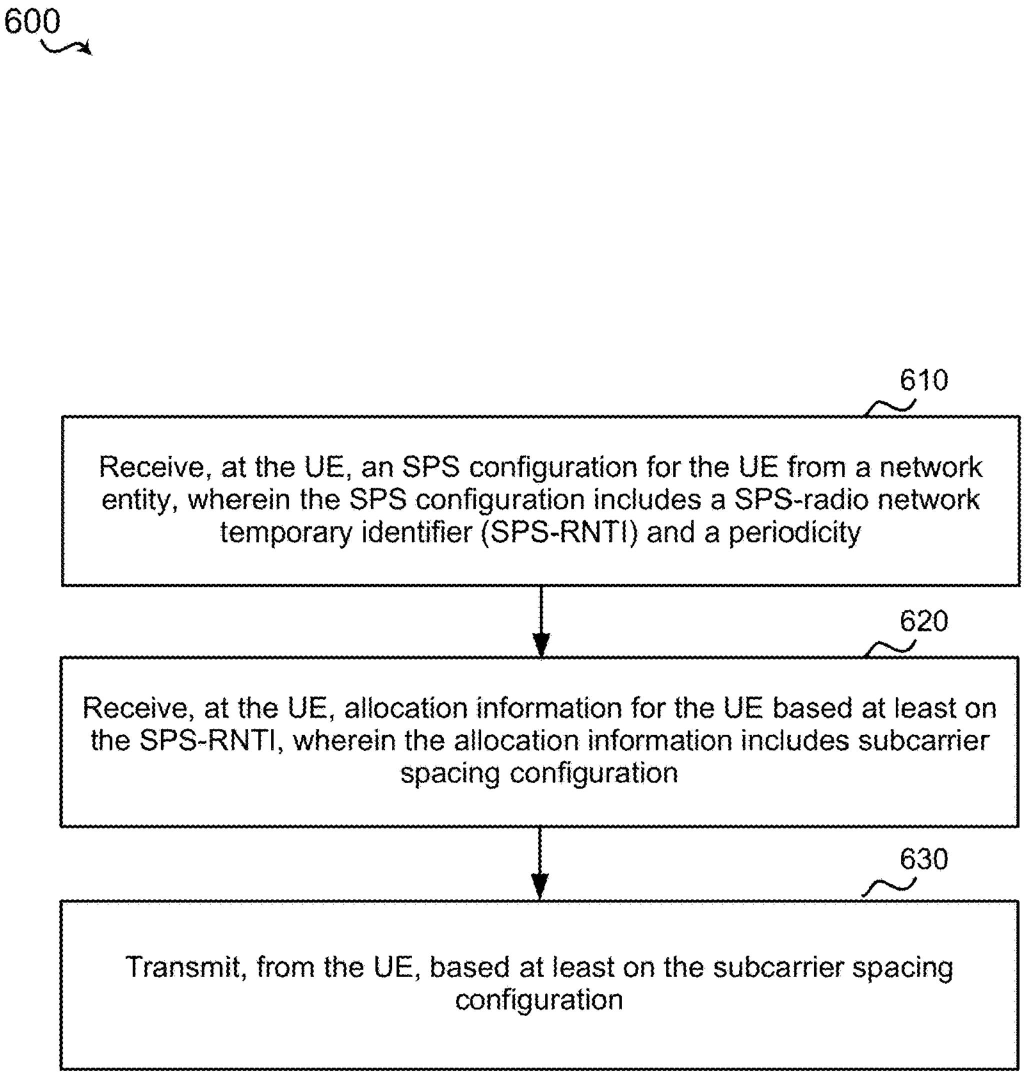
FIG. 6 is a flow diagram illustrating an example of a method of transmitting from a UE with SPS in a wireless communication system in accordance with one or more aspects of the disclosure.

Referring to FIG. 6, a flow diagram illustrating examples of a method 600 related to transmitting from a UE with SPS in accordance with various aspects of the present disclosure is described. Although the operations described below are presented in a particular order and/or as being performed by an example component, the ordering of the actions and the components performing the actions may be varied, depending on the implementation. Also, although the adaptive subcarrier component 150 is illustrated as having a number of subcomponents, one or more of the illustrated subcomponents may be separate from, but in communication with, the adaptive subcarrier component 150, and/or each other. Moreover, any of actions or components described below with respect to the adaptive subcarrier component 150 and/or any subcomponents may be performed by a specially-programmed processor, a processor executing specially-programmed software or computer-readable media, or by any other combination of a hardware component and/or a software component specially configured for performing the described actions or components.

In an aspect, at block 610, method 600 includes receiving, at the UE, SPS configuration for the UE from a network entity, wherein the SPS configuration includes a SPS-radio network temporary identifier (SPS-RNTI) and a periodicity. For example, in an aspect, UE 110 and/or adaptive subcarrier component 150 receives SPS configuration via a transmitter (e.g., transmitter 1008, FIG. 10), as described herein.

In an aspect, at block 620, method 600 includes receiving, at the UE, allocation information for the UE based at least on the SPS-RNTI, wherein the allocation information includes subcarrier spacing configuration. For example, in an aspect, UE 110 and/or adaptive subcarrier component 150 receives allocation information via a transmitter (e.g., transmitter 1008, FIG. 10), as described herein. In an example, the allocation information is received via DCI in a PDCCH.

In an aspect, at block 630, method 600 includes transmitting, by the UE, based at least on the subcarrier spacing configuration. For example, in an aspect, UE 110 and/or adaptive subcarrier component 150 may transmit based at least on the subcarrier spacing configuration, as described herein.

Referring to FIG. 7, a flow diagram illustrating examples of a method 700 related to transmitting from a UE with SPS in accordance with various aspects of the present disclosure is described. Although the operations described below are presented in a particular order and/or as being performed by an example component, that the ordering of the actions and the components performing the actions may be varied, depending on the implementation. Also, although the adaptive subcarrier component 150 is illustrated as having a number of subcomponents, one or more of the illustrated subcomponents may be separate from, but in communication with, the adaptive subcarrier component 150, and/or each other. Moreover, any of actions or components described below with respect to the adaptive subcarrier component 150 and/or any subcomponents may be performed by a specially-programmed processor, a processor executing specially-programmed software or computer-readable media, or by any other combination of a hardware component and/or a software component specially configured for performing the described actions or components.

In an aspect, at block 710, method 700 includes receiving, at the UE, SPS configuration for the UE from a network entity, wherein the SPS configuration includes a SPS-radio network temporary identifier (SPS-RNTI), a periodicity, and subcarrier spacing configuration, and wherein the subcarrier spacing configuration includes a plurality of subcarrier spacings. For example, in an aspect, UE 110 and/or adaptive subcarrier component 150 may receive SPS configuration via a transmitter (e.g., transmitter 1008, FIG. 10), as described herein. The SPS configuration includes an RRC configuration of the plurality of subcarrier spacings.

In an aspect, at block 720, method 700 includes transmitting, by the UE, with a subcarrier spacing of the plurality of subcarrier spacings based at least on an indication received via DCI over a PDCCH from the eNB. For instance, in an aspect, UE 110 and/or adaptive subcarrier component 150 may configure a subcarrier spacing, as described herein.

Figure 8:
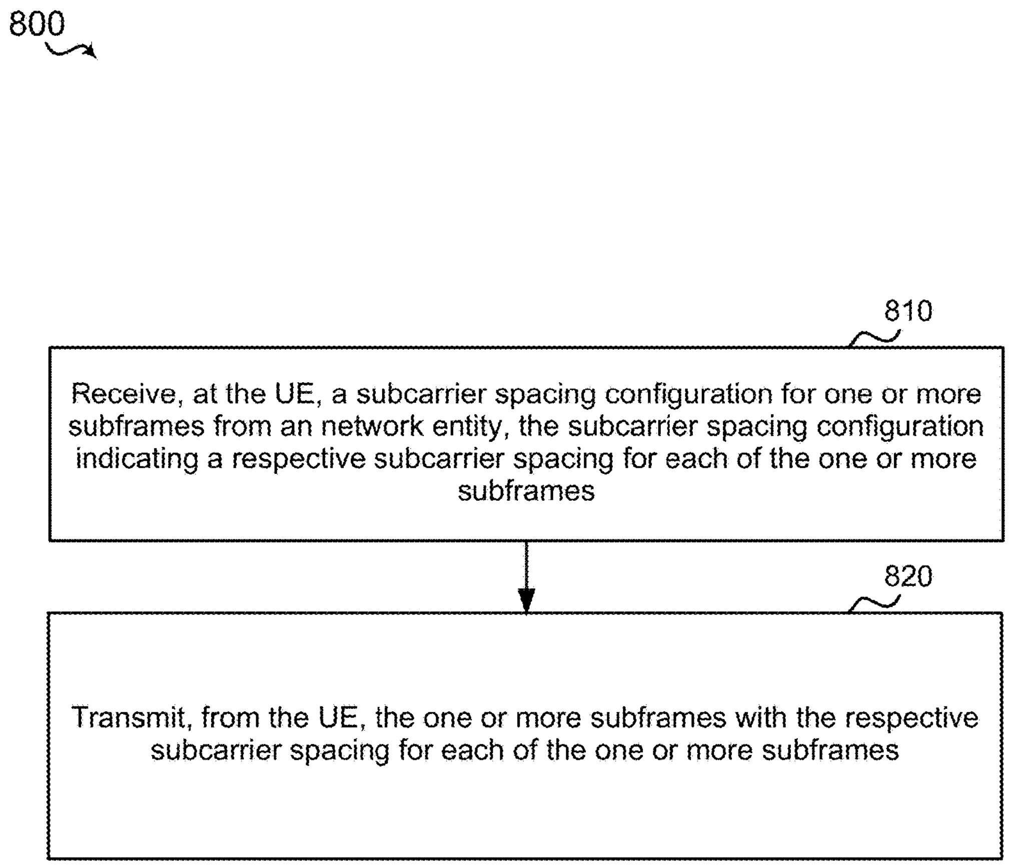
FIG. 8 is a flow diagram illustrating an example of a method of transmitting from a UE in a wireless communication system in accordance with one or more aspects of the disclosure.

Referring to FIG. 8, a flow diagram illustrating examples of a method 800 related to transmitting from a UE with SPS in accordance with various aspects of the present disclosure is described. Although the operations described below are presented in a particular order and/or as being performed by an example component, the ordering of the actions and the components performing the actions may be varied, depending on the implementation. Also, although the adaptive subcarrier component 150 is illustrated as having a number of subcomponents, one or more of the illustrated subcomponents may be separate from, but in communication with, the adaptive subcarrier component 150, and/or each other. Moreover, any of actions or components described below with respect to the adaptive subcarrier component 150 and/or any subcomponents may be performed by a specially-programmed processor, a processor executing specially-programmed software or computer-readable media, or by any other combination of a hardware component and/or a software component specially configured for performing the described actions or components.

In an aspect, at block 810, method 800 includes receiving, at the UE, a subcarrier spacing configuration for one or more subframes from a network entity, the subcarrier spacing configuration indicating a respective subcarrier spacing for each of the one or more subframes. For example, in an aspect, UE 110 and/or adaptive subcarrier component 150 may receive subcarrier spacing configuration via a transmitter (e.g., transmitter 1008, FIG. 10), as described herein.

In an example, the respective subcarrier spacing of each of the one or more subframes applies to all physical channels at the UE. In a further example, the respective subcarrier spacing of each of the one or more subframes applies to a sub-set of physical channels at the UE. Further, the respective subcarrier spacing of each of the one or more subframes does not apply to a Primary Synchronization Signal (PSS) or a Secondary Synchronization Signal (SSS). The one or more subframes correspond to one or more subframes of the Physical Downlink Control Channel (PDCCH).

In an aspect, at block 820, method 800 includes transmitting, from the UE, the one or more subframes with the respective subcarrier spacing for each of the one or more subframes. For example, in an aspect, UE 110 and/or adaptive subcarrier component 150 may transmit subframes with a subcarrier spacing of each subframe based on the subcarrier spacing configuration received from the eNB, as described herein. In one example, UE 110 transmits on a per subframe basis. This is different from conventional LTE networks where the subcarrier spacing is fixed for all subframes. Additionally, UE 110, based on the subframe configuration received from base station 105 over PDCCH, may further allow time division multiplexing (TDM) of different technologies, e.g., NR and LTE; or TDM of several applications/use cases, e.g., enhanced mobile broadband (eMBB), enhanced massive machine-type communications (eMMTC), critical MTC, etc.

In one implementation, UE 110 may transmit on a per-subframe basis for all physical channels transmitted from UE 110 or a subset of all physical channels transmitted from UE 110. This provides for flexibility to transmit, physical channels at UE 110, with different subcarrier spacings as needed to improve efficiency in wireless communications.

Figure 9:
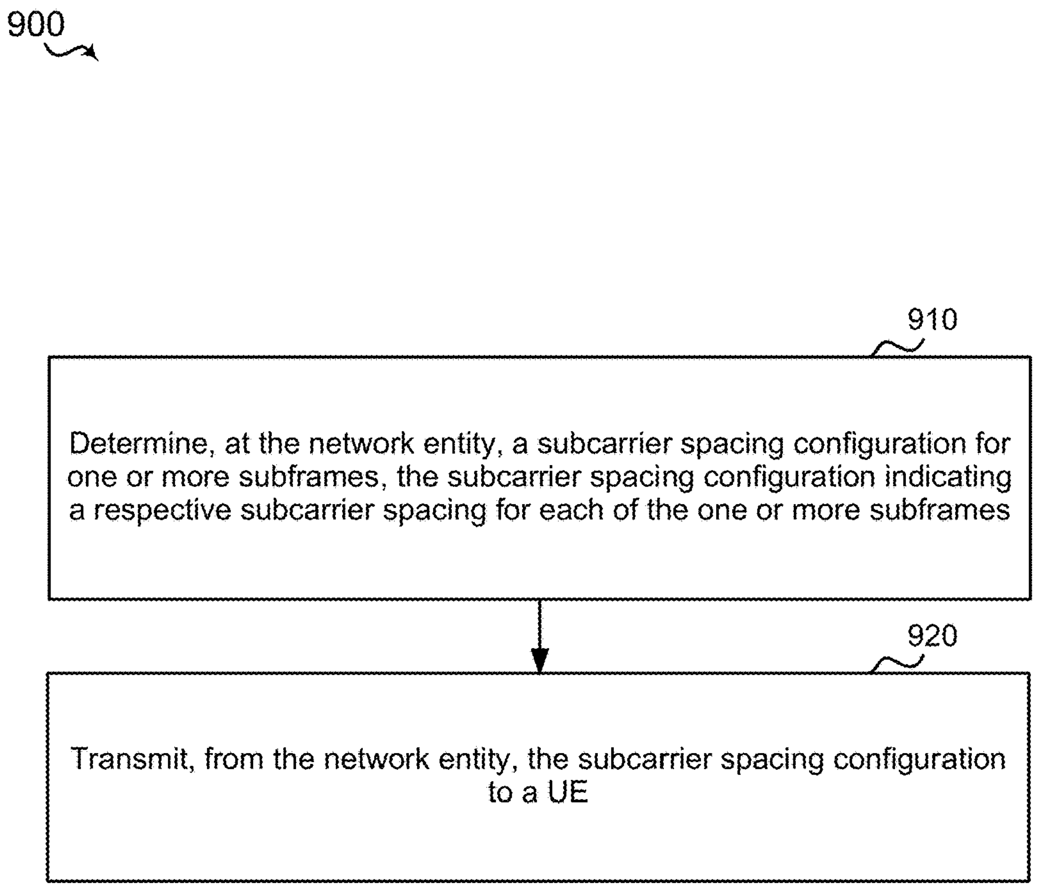
FIG. 9 is a flow diagram illustrating an example of a method of transmitting from a network entity in a wireless communication system in accordance with one or more aspects of the disclosure.

FIG. 9 is a flow diagram illustrating examples of a method 900 related to adapting subcarrier spacings for subframes at a network entity in accordance with various aspects of the present disclosure. Although the operations described below are presented in a particular order and/or as being performed by an example component, the ordering of the actions and the components performing the actions may be varied, depending on the implementation. Also, although the subcarrier spacing component 170 is illustrated as having a number of subcomponents, one or more of the illustrated subcomponents may be separate from, but in communication with, the subcarrier spacing component 170, and/or each other. Moreover, any of actions or components described below with respect to the subcarrier spacing component 170 and/or any subcomponents may be performed by a specially-programmed processor, a processor executing specially-programmed software or computer-readable media, or by any other combination of a hardware component and/or a software component specially configured for performing the described actions or components.

In an aspect, at block 910, method 900 includes determining, at the network entity, a subcarrier spacing configuration for one or more subframes, the subcarrier spacing configuration indicating a respective subcarrier spacing for each of the one or more subframes. For example, in an aspect, network entity 110 and/or subcarrier spacing component 170 may determine a subcarrier spacing configuration for one or more subframes, the subcarrier spacing configuration indicating a respective subcarrier spacing for each of the one or more subframes.

In an example, the respective subcarrier spacing of each of the one or more subframes applies to all physical channels at the UE. In a further example, the respective subcarrier spacing of each of the one or more subframes applies to a sub-set of physical channels at the UE. Further, the respective subcarrier spacing of each of the one or more subframes does not apply to a Primary Synchronization Signal (PSS) or a Secondary Synchronization Signal (SSS). The one or more subframes correspond to one or more subframes of the Physical Downlink Control Channel (PDCCH).

In an aspect, at block 920, method 900 includes transmitting, from the network entity to the UE, the subcarrier spacing configuration. For example, in an aspect, network entity 110 and/or subcarrier spacing component 170 may transmit the subcarrier spacing configuration to a UE.

Figure 10:
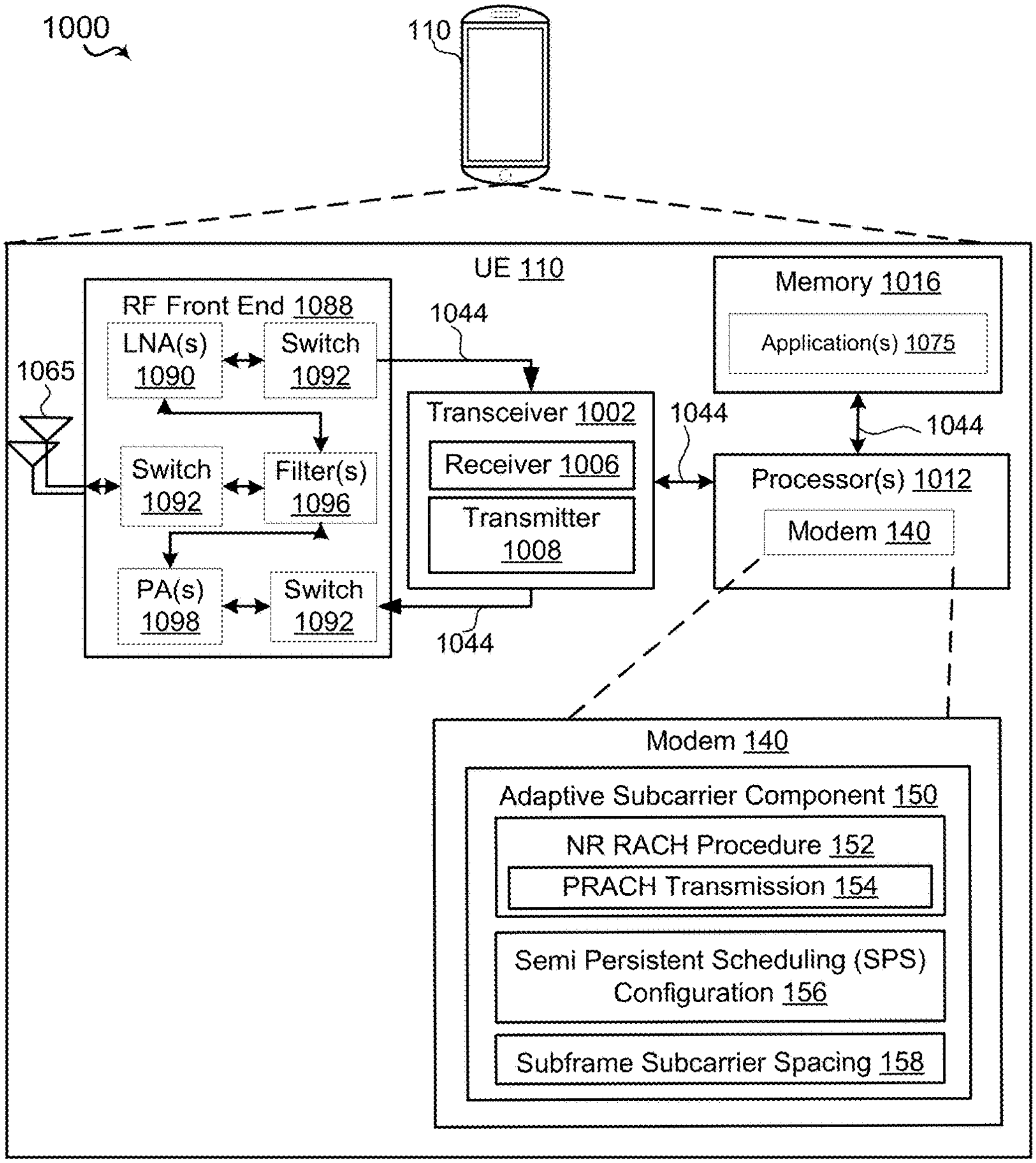
FIG. 10 is a schematic diagram of example components of the UE of FIG. 1.

Referring to FIG. 10, one example of an implementation of UE 110 may include a variety of components, some of which have already been described above, but including components such as one or more processors 1012 and memory 1016 and transceiver 1002 in communication via one or more buses 1044, which may operate in conjunction with modem 140. Further, the one or more processors 1012, modem 1014, memory 1016, transceiver 1002, RF front end 1088 and one or more antennas 1065, may be configured to support voice and/or data calls (simultaneously or non-simultaneously) in one or more radio access technologies.

In an aspect, the one or more processors 1012 can include a modem 1014 that uses one or more modem processors. The various functions related to subcarrier spacing configuration may be included in modem 140 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 140 associated with subcarrier spacing configuration may be performed by transceiver 1002.

Also, memory 1016 may be configured to store data used herein and/or local versions of applications 1075 being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes, and/or data associated therewith, when UE 110 is operating at least one processor 1012 to execute adaptive subcarrier component 150 including NR RACH procedure 152, SPS configuration 156, and/or subframe subcarrier spacing 158.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 105. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, UE 110 may include RF front end 1088, which may operate in communication with one or more antennas 1065 and transceiver 1002 for receiving and transmitting radio transmissions, for example, wireless communications transmitted by at least one base station 105 or wireless transmissions transmitted by UE 110. RF front end 1088 may be connected to one or more antennas 1065 and can include one or more low-noise amplifiers (LNAs) 1090, one or more switches 1092, one or more power amplifiers (PAs) 1098, and one or more filters 10106 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 10102 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 10108 may have specified minimum and maximum gain values. In an aspect, RF front end 1088 may use one or more switches 1092 to select a particular PA 10108 and its specified gain value based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 10106 can be connected to a specific LNA 1090 and/or PA 1098. In an aspect, RF front end 1088 can use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 1002 to operate at a specified frequency and power level based on the UE configuration of the UE 110 and the communication protocol used by modem 140.

In an aspect, modem 140 can be a multiband-multimode modem, which can process digital data and communicate with transceiver 1002 such that the digital data is sent and received using transceiver 1002. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 11:
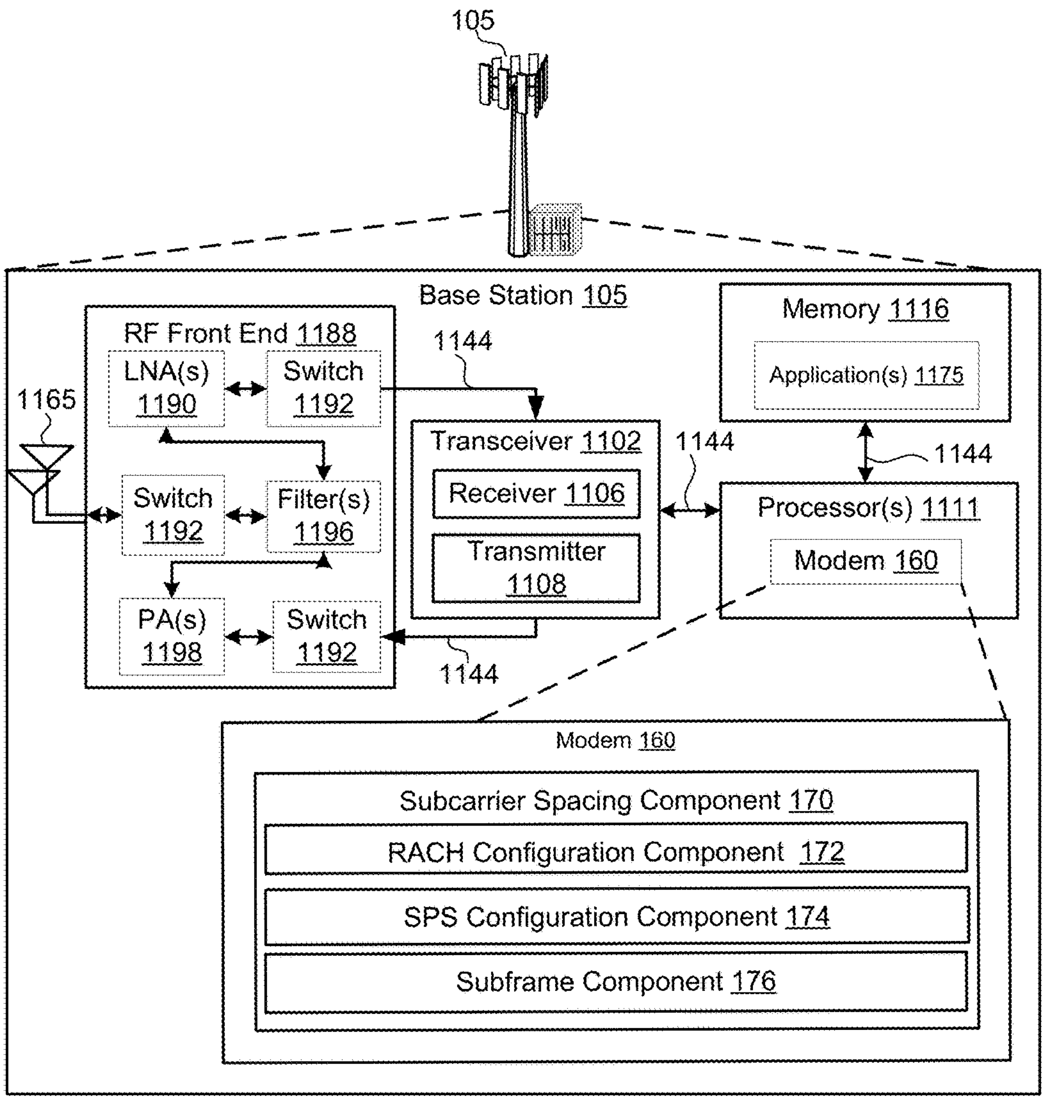
FIG. 11 is a schematic diagram of example components of the base station of FIG. 1.

Referring to FIG. 11, one example of an implementation of base station 105 may include a variety of components, some of which have already been described above, but including components such as one or more processors 1112, a memory 1116, and a transceiver 1102 in communication via one or more buses 1144, which may operate in conjunction with modem 160 and the subcarrier spacing component 170.

The transceiver 1102, receiver 1106, transmitter 1108, one or more processors 1112, memory 1116, applications 1175, buses 1144, RF front end 1188, LNAs 1190, switches 1192, filters 1196, PAs 1198, and one or more antennas 1165 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of transmitting a physical random access channel (PRACH) from a user equipment (UE), comprising:

transmitting, from the UE to a network entity, a first PRACH transmission with a first subcarrier spacing;

determining, by the UE, that the first PRACH transmission to the network entity is not successful;

transmitting, from the UE to the network entity, a second PRACH transmission with a second subcarrier spacing in response to determining that the first PRACH transmission is not successful, wherein the first subcarrier spacing is different from the second subcarrier spacing; and transmitting, by the UE to the network entity, one or more additional PRACH transmissions until the UE determines that one of the one or more additional PRACH transmissions are successful or a PRACH re-transmission attempt limit is reached, wherein the one or more additional PRACH transmissions are sent with a subsequent subcarrier spacing that is different from the first subcarrier spacing and the second subcarrier spacing.

2. The method of claim 1, further comprising receiving, by the UE to the network entity, the first subcarrier spacing and the second subcarrier spacing via system information.

3. The method of claim 2, wherein the system information includes a random access channel (RACH) configuration indicating a link between the first subcarrier spacing and the second subcarrier spacing.

4. The method of claim 2, wherein the system information corresponds to a Downlink Control Information (DCI).

5. The method of claim 1, wherein a duration of the PRACH changes based on transmitting the second PRACH transmission.

6. The method of claim 1, wherein the second subcarrier spacing is lower than the first subcarrier spacing such that a second duration of the transmission of the second PRACH transmission is longer than a first duration of the transmission of the first PRACH transmission.

7. An apparatus for transmitting a physical random access channel (PRACH) from a user equipment (UE), comprising:

a memory; and at least one processor coupled to the memory and configured to:

transmit, from the UE to a network entity, a first PRACH transmission with a first subcarrier spacing;

determine, by the UE, that the first PRACH transmission to the network entity is not successful;

transmit, from the UE to the network entity, a second PRACH transmission with a second subcarrier spacing in response to determining that the first PRACH transmission is not successful, wherein the first subcarrier spacing is different from the second subcarrier spacing; and transmit, by the UE to the network entity, one or more additional PRACH transmissions until the UE determines that one of the one or more additional PRACH transmissions are successful or a PRACH re-transmission attempt limit is reached, wherein the one or more additional PRACH transmissions are sent with a subsequent subcarrier spacing that is different from the first subcarrier spacing and the second subcarrier spacing.

8. The apparatus of claim 7, wherein the at least one processor is further configured to receive, by the UE to the network entity, the first subcarrier spacing and the second subcarrier spacing via system information.

9. The apparatus of claim 8, wherein the system information includes a random access channel (RACH) configuration indicating a link between the first subcarrier spacing and the second subcarrier spacing.

10. The apparatus of claim 8, wherein the system information corresponds to a Downlink Control Information (DCI).

11. The apparatus of claim 7, wherein a duration of the PRACH changes based on transmitting the second PRACH transmission.

12. The apparatus of claim 7, wherein the second subcarrier spacing is lower than the first subcarrier spacing such that a second duration of the transmission of the second PRACH transmission is longer than a first duration of the transmission of the first PRACH transmission.

* * * * *